(12) United States Patent
Kirjavainen (10) Patent No.: US 6,511,017 B2
(45) Date of Patent: Jan. 28, 2003

(54) METHOD OF STEERING AIRCRAFT, AND AIRCRAFT

(75) Inventor: Kari Kirjavainen, Tampere (FI)

(73) Assignee: Natural Colour Kari Kirjavainen OY, Tampere (FI)

( * ) Notice: Subject to any disclaimer, the term of this patent is extended or adjusted under 35 U.S.C. 154(b) by 0 days.

(21) Appl. No.: 09/944,182

(22) Filed: Sep. 4, 2001

(65) Prior Publication Data

US 2002/0030137 A1 Mar. 14, 2002

Related U.S. Application Data

(63) Continuation of application No. PCT/FI00/00159, filed on Mar. 1, 2000.

(30) Foreign Application Priority Data

| Mar. 1, 1999 | (FI) | 990425 |
| Apr. 27, 1999 | (FI) | 990942 |
| Apr. 27, 1999 | (FI) | 990943 |

(51) Int. Cl.$^7$ ............................................. B64C 29/00
(52) U.S. Cl. ........................................ 244/12.1; 244/51
(58) Field of Search ................... 244/23 R, 23 D, 244/12.1, 12.5, 51, 66

(56) References Cited

U.S. PATENT DOCUMENTS

| 2,419,780 A | | 4/1947 | Jordan | |
| 2,424,556 A | | 7/1947 | Custer | |
| 2,532,481 A | | 12/1950 | Custer | |
| 2,918,230 A | | 12/1959 | Lippisch | |
| 2,929,580 A | | 3/1960 | Ciolkosz | |
| 3,126,171 A | | 3/1964 | Stepniewski et al. | |
| 3,837,600 A | * | 9/1974 | Mason | 244/12.1 |
| 3,901,463 A | * | 8/1975 | Kovacs | |
| 4,110,631 A | * | 8/1978 | Salter | 290/55 |
| 4,415,133 A | * | 11/1983 | Phillips | 244/13 |
| 4,537,372 A | * | 8/1985 | Forizs | 244/12.4 |
| 4,726,546 A | * | 2/1988 | De Angelis | |
| 4,804,155 A | * | 2/1989 | Strumbos | 244/12.6 |
| 5,597,137 A | * | 1/1997 | Skoglun | 244/12.4 |
| 5,765,783 A | * | 6/1998 | Albion | 244/17.23 |
| 5,839,691 A | * | 11/1998 | Lariviere | 244/12.4 |

FOREIGN PATENT DOCUMENTS

EP  1403600  8/1975

* cited by examiner

*Primary Examiner*—Peter M. Poon
*Assistant Examiner*—Timothy D Collins
(74) *Attorney, Agent, or Firm*—Young & Thompson (57) ABSTRACT

A method of steering an aircraft, and an aircraft comprising a supporting structure, at least one utility space, at least two propellers whose axles are arranged horizontally, and a driving mechanism to rotate each propeller. The blade angles of at least one propeller of the aircraft are adjusted as a function of a rotation angle of the propeller such that the blow power of the propellers provides the aircraft with a lifting force, and after take-off of the aircraft the blade angles of the propellers are adjusted such that the blow power of the propellers provides the aircraft with horizontal flight.

26 Claims, 10 Drawing Sheets

METHOD OF STEERING AIRCRAFT, AND AIRCRAFT

This application is a Continuation of International Application PCT/FI00/00159 filed on Mar. 1, 2000 which designated the U.S. and was published under PCT Article 21(2) in English.

BACKGROUND OF THE INVENTION

The invention relates to a method of steering an aircraft comprising a supporting structure, at least one utility space, at least two propellers whose axles are arranged substantially horizontally, and a driving mechanism to rotate each propeller, the blade angles of at least one propeller of the aircraft being adjustable such that the blow power of the propellers provides the aircraft with a lifting force, and after take-off of the aircraft the blade angles of the propeller are adjusted such that the blow power of the propellers provides the aircraft with horizontal flight.

The invention further relates to an aircraft comprising a supporting structure, at least one utility space, at least two propellers whose axles are arranged substantially horizontally, and a driving mechanism to rotate each propeller, the blade angles of at least one propeller of the aircraft being adjustable such that the blow power of the propellers provides the aircraft with a lifting force, and after take-off of the aircraft the blade angles of the propeller are adjusted such that the blow power of the propellers provides the aircraft with horizontal flight.

U.S. Pat. No. 3,901,463 discloses a vertical take-off aerodyne comprising at least two propellers mounted on the same drive shaft, a driving mechanism to rotate the propellers, and an arch-shaped airfoil placed above the propellers. In order to move the aircraft according to the publication in the vertical direction, the blade angles of at least one of the propellers can be regulated so as to enable the propellers to draw the ambient air in the opposite directions into the space between the propellers, where the flow of air is guided downwards by the arc-shaped airfoil, thus producing a vertical lifting force to lift the apparatus. In order to move the apparatus horizontally, the blade angles of the propeller can be reversed to produce a parallel flow of air from the propellers for a forward movement of the aerodyne, whereby the apparatus can be steered by a rudder and an aileron during flight. Since the apparatus disclosed in the publication can be steered by the rudder and aileron during the actual flight only, in practice the apparatus is non-steerable during vertical take-off and landing.

SUMMARY OF THE INVENTION

An object of the present invention is to provide a simple and reliable method for steering an aircraft.

A method of the invention is characterized in that the blade angles of a propeller are adjusted as a function of a rotation angle of the propeller.

An aircraft of the invention is characterized in that the blade angles of the propeller are adjustable as a function of a rotation angle of the propeller.

The idea underlying the invention is that on an aircraft comprising a supporting structure, at least one utility space, at least two propellers arranged in the aircraft such that their axles are substantially in the horizontal direction, and a driving mechanism to rotate each propeller, the blade angles of at least one propeller can be adjusted as a function of a rotation angle of the propeller such that the blow power of the propellers provides the aircraft with a lifting force, and after take-off of the aircraft the blade angles of the propeller can be adjusted such that the blow power of the propellers provides the aircraft with horizontal flight. According to the basic idea of the invention, the aircraft is able to take-off and land vertically, but also take-off and landing runs can be used, whereby by adjusting the blade angles, the blow power of the propellers can be regulated to produce a lifting or a lowering force in order to shorten the take-off and landing runs. According to a preferred embodiment of the invention, the supporting structure of the aircraft is comprised of an upper wing, a front wing located below the upper wing and a rear wing located below the upper wing and behind the front wing, an air discharge opening being provided between the front wing and the rear wing. According to a second preferred embodiment of the invention, the supporting structure of the aircraft is comprised of a wing forming an open-topped tunnel duct with propellers mounted at the ends thereof above the wing. According to a third preferred embodiment of the invention, the supporting structure of the aircraft is comprised of a wing with respect to whose front edge and rear edge propellers are arranged such that the axles of the propellers are substantially at the level of the wing.

An advantage of the invention is that the aircraft is steerable both during vertical take-off and landing and while using short take-off and landing runs. Furthermore, the aircraft requires no rudder nor aileron but the apparatus is steerable by the solution of the invention also during the actual flight.

BRIEF DESCRIPTION OF THE DRAWINGS

The invention will be described in closer detail in the accompanying drawings, in which.

DETAILED DESCRIPTION OF THE PREFERRED EMBODIMENTS

Figure 1A:
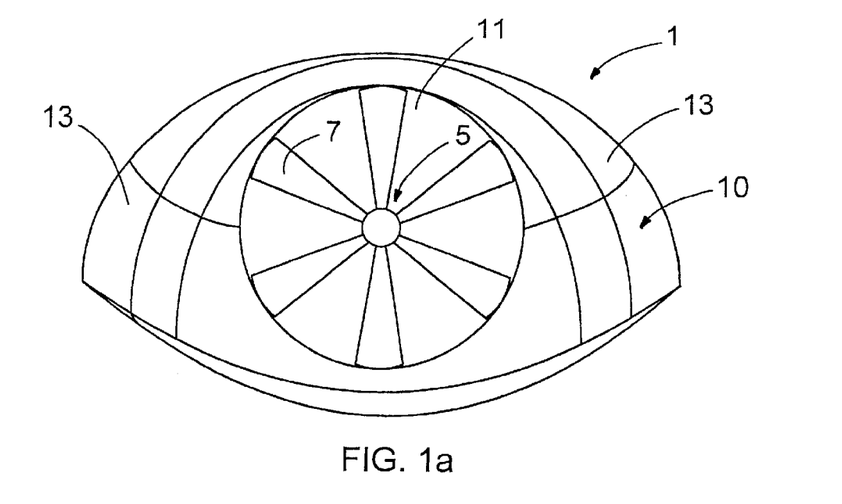
FIG. 1a is a schematic front view of an embodiment of an aircraft according to the invention.
Figure 1B:
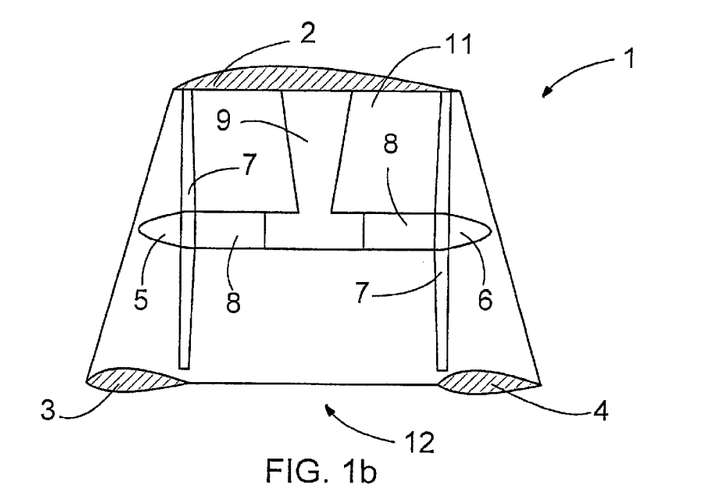
FIG. 1b is a partially sectional side view of the same.
Figure 1C:
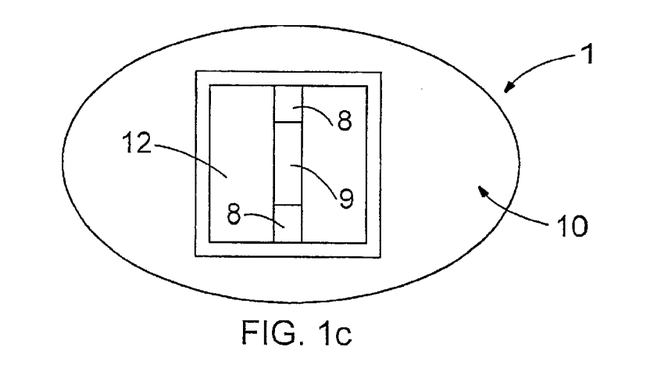
FIG. 1c is a bottom view of the same, and FIG. 1d a partially sectional top view of the same.
Figure 1D:
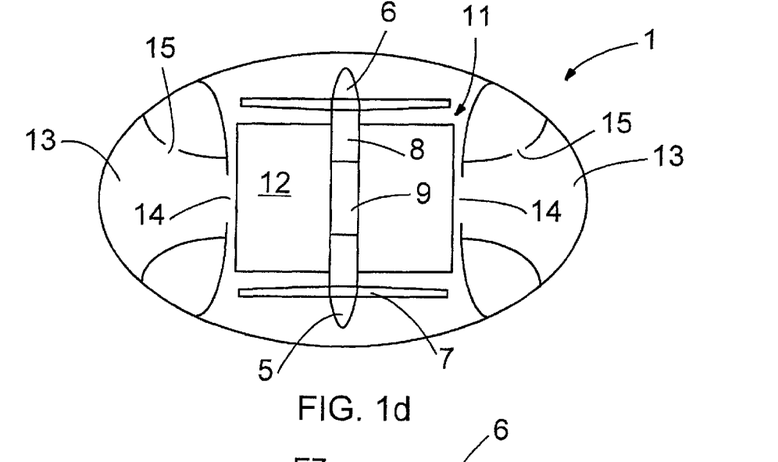

FIG. 1a is a schematic front view of an aircraft 1 according to the invention, FIG. 1b is a partially sectional side view of the same, FIG. 1c is a bottom view of the same, and FIG. 1d a partially sectional top view of the same. A structure to keep the aircraft 1 according to FIGS. 1a to 1d in the air, i.e. a supporting structure, comprises an upper wing 2 and a front wing 3 located at the front end of the aircraft 1 and a rear wing 4 located at the rear end. Below the upper wing 2 of the aircraft 1 are located propellers 5 and 6 or blow propellers 5 and 6 such that the blow propeller 5 is located substantially at the front edge of the upper wing 2, and the blow propeller 6 is located substantially at the rear edge of the upper wing 2. The propellers 5 and 6 are arranged in the aircraft 1 such that their axles are horizontal. With respect to the front wing 3, the blow propeller 5 is located substantially at the rear edge of the front wing 3, and with respect to the rear wing 4, the blow propeller 6 is located substantially at the front edge of the rear wing 4. The aircraft 1 shown in FIG. 1 is provided with six propeller blades 7 or blades 7 in the propellers 5 and 6; however, the number of the blades 7 can vary. The number of the blades 7 is preferably three or more. The blow propellers 5 and 6 are run by driving mechanisms 8 that are supported against the upper wing 2 of the aircraft 1 by a propeller support 9. A utility space 13, covered by a cover 10, is provided at both sides of the blow propellers 5 and 6, which utility spaces 13 combine the upper wing 2, the front wing 3 and the rear wing 4 with each other, forming a tunnel duct 11 for the blow propellers 5 and 6, which tunnel duct 11 comprises an air discharge opening 12 at its lower part between the front wing 3 and the rear wing 4. The utility space 13 can be used e.g. as a cockpit, cabin or cargo transport area. In FIG. 1a, the utility spaces 13 have a convex shape in order to provide ample space; however, the utility spaces 13 may have various different shapes. FIG. 1d schematically shows how the utility spaces 13 at the tunnel duct 11 comprise one or more inlet openings 14 for air and the rear part of the utility spaces 13 comprises one or more outlet openings 15 for air wherethrough the air pressurized into the tunnel duct 11 can be led through the utility spaces 13 and the flow can thus be prevented from becoming detached from the rear surfaces of the utility spaces 13. Similarly, the entire aircraft 1 can be pressurized, whereby a soft and light structure can be used as the surfaces, i.e. the cover 10, to define the utility spaces 13 of the aircraft 1.

Figure 2A:
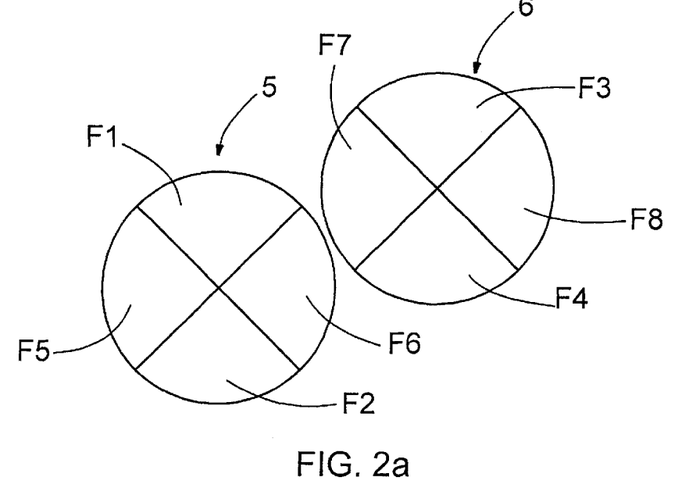
FIG. 2a shows schematically a method of the invention for steering an aircraft, viewed from the front of the aircraft.
Figure 2B:
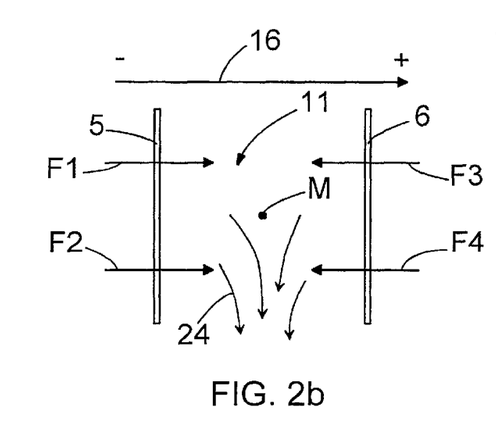
FIG. 2b is a side view of the same, and FIG. 2c a top view of the same.
Figure 2C:
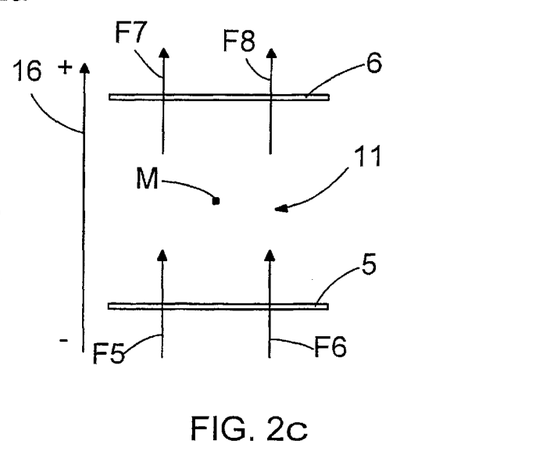

FIGS. 2a, 2b and 2c schematically show a method for steering the aircraft 1 shown in FIGS. 1a to 1d. FIG. 2a is a schematic front view of the blow propellers 5 and 6. The rotation circle of both blow propellers 5 and 6 is divided into four parts. The rotation circle of the blow propeller 5 comprises sectors F1, F2, F5 and F6, and the rotation circle of the blow propeller 6 comprises sectors F3, F4, F7 and F8. The sectors of the blow propellers 5 and 6 according to FIG. 2a correspond to force vectors F1, F2, F3, F4, F5, F6, F7 and F8 shown in FIGS. 2b and 2c to describe the strength and direction of the air flow caused by the blow propellers 5 and 6. By changing or adjusting, in a manner according to the invention, the blade angles of the blades 7 of the blow propellers 5 and 6 as a function of a rotation angle such that the blade angles of the blades 7 can deviate from each other in each sector F1 to F8 according to FIG. 2a, the size and direction of force vectors F1 to F8 can be changed, and thus, the aircraft 1 can be steered. The blow propellers 5 and 6 may rotate in the same direction or in different directions and their rotation speeds can also differ from each other. The blade angles of the blades 7 can be controlled by e.g. similar mechanisms as used on a helicopter. When the blades 7 of the blow propellers 5 and 6 are in sectors F1, F2, F3 and F4, the blade angles of the blades 7 can be adjusted in order to steer the aircraft 1 vertically. When the blades 7 of the blow propellers 5 and 6 are in sectors F5, F6, F7 and F8, the blade angles of the blades 7 are adjusted in order to steer the aircraft 1 horizontally. The blade angles of the blades 7 are thus adjusted as a function of a rotation angle of the propeller such that in each sector F1 to F8, the size and direction of the air flow caused by the blades 7 can be adjusted separately, whereby the aircraft 1 can be steered three-dimensionally with respect to its centre of gravity M shown in FIGS. 2b and 2c.

FIG. 2b is a schematic side view of the size and direction of the air flows caused by the blow propellers 5 and 6 of the aircraft 1 when the aircraft 1 lifts off vertically. FIG. 2c is a schematic top view of the size and direction of the air flows caused by the blow propellers 5 and 6 when the aircraft 1 moves straight forward. In FIGS. 2b and 2c, the direction indicated by vector 16 is selected as the positive direction of the air flows. The centre of gravity of the aircraft 1 is denoted by the letter M, and the location of the centre of gravity M may be altered by changing the location of the cargo on the aircraft 1. In FIG. 2b, the blade angles of the blades 7 of the blow propellers 5 and 6 are adjusted in sectors F1 to F4 such that when the blow propellers 5 and 6 rotate, the blades 7 draw in the ambient air into the tunnel duct 11 therebetween as shown by force vectors F1 to F4. The air drawn into the tunnel duct 11 is discharged through the air discharge opening 12 located at the lower part of the tunnel duct 11 in the manner shown by arrows 24, whereby a high overpressure is formed on the lower surface of the upper wing 2 while a high low pressure is formed on the upper surfaces of the front wing 3 and the rear wing 4; consequently, the aircraft 1 is subject to a lifting force which causes the aircraft 1 to lift off vertically. When force vectors F1 to F4 are equal in size, as in FIG. 2b, the aircraft 1 lifts off substantially vertically. In the case shown by FIG. 2b, by adjusting the blade angles of the blades 7 e.g. in sectors F1 and F2 of the blow propeller 5 one upon the other such that force vectors F1 and F2 point in the opposite directions, the aircraft 1 can be turned in the vertical direction. After take-off, the blade angles of the blades 7 of the blow propeller 6 are reversed in FIG. 2b such that force vectors F3 and F4 point in the positive direction indicated by vector 16, whereby the directions of the air flows corresponding to force vectors F1 and F2 are positive, whereby the aircraft 1 moves forward in an aeroplane-like manner by means of a propulsive force caused by the blow propellers 5 and 6 and a lifting force provided by the upper wing 2 and the front wing 3 and the rear wing 4. FIG. 2c schematically shows how during horizontal flight of the aircraft 1, force vectors F5 to F8 corresponding to sectors F5 to F8 of the blow propellers 5 and 6 point, according to vector 16, in the positive direction, i.e. backwards, causing the aircraft 1 to move directly forward as force vectors F5 to F8 are equal in size.

By changing the blade angles of the blades 7 of the blow propellers 5 and 6 as a function of a rotation angle as well as the rotation directions and rotation speeds of the blow propellers 5 and 6, the sizes and directions of the air flows corresponding to force vectors F1 to F8 are thus affected such that the air flows cause a moment which correspond to steering manoeuvres with respect to centre of gravity M, the aircraft 1 becoming three-dimensionally steerable with respect to centre of gravity M by means of the moment. Since the aircraft 1 is steered by adjusting the blade angles of the blades 7 of the blow propellers 5 and 6 as a function of a rotation angle, the aircraft 1 is also horizontally steerable during vertical take-off, so no need exists for the aircraft 1 to move horizontally in order to be horizontally steerable. Furthermore, the aircraft 1 needs no separate aileron nor rudder for being horizontally steerable.

When take-off or landing runs are used during take-off or landing, the blade angles of the blades 7 of the blow propellers 5 and 6 can be adjusted such that the blow power of the blow propellers 5 and 6 is controlled in order to provide a lifting or lowering force to shorten the take-off or landing runs of the aircraft 1.

The division of the rotation circle of the blow propellers 5 and 6 into sectors shown in FIG. 2*a* can be implemented in many ways. The number of the sectors can vary, as can the positions of the sectors on the rotation circle. The manner in which the rotation circle is divided into sectors can also be changed while the aircraft 1 is in use. The division of the rotation circle into sectors is mainly presented to make the invention easier to illustrate. In practice, the blade angles of the blades 7 change steplessly from positive via zero angle to negative and vice versa in a sine-curve-type manner.

Figure 3A:
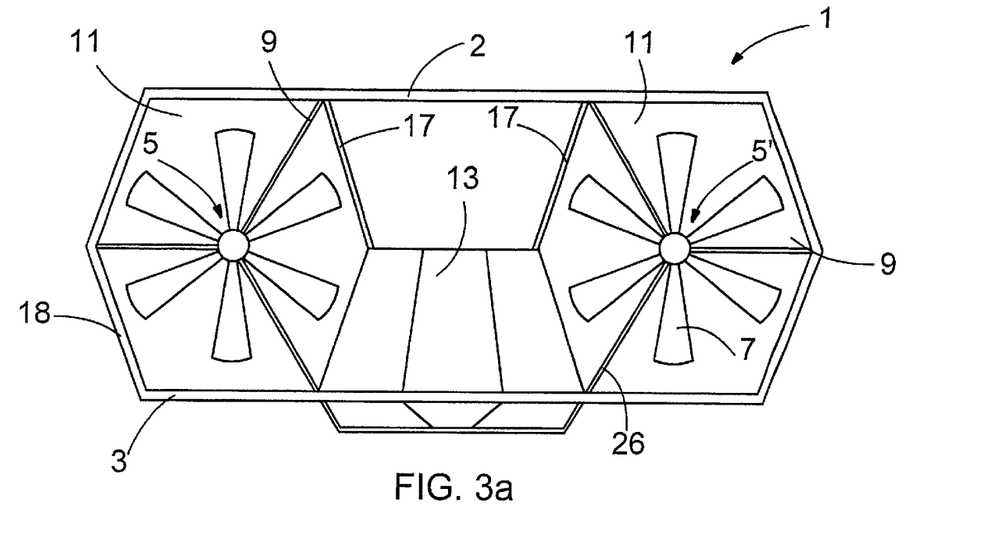
FIG. 3a is a schematic front view of a second embodiment of the aircraft of the invention, and FIG. 3b a partially sectional side view of the same.
Figure 3B:
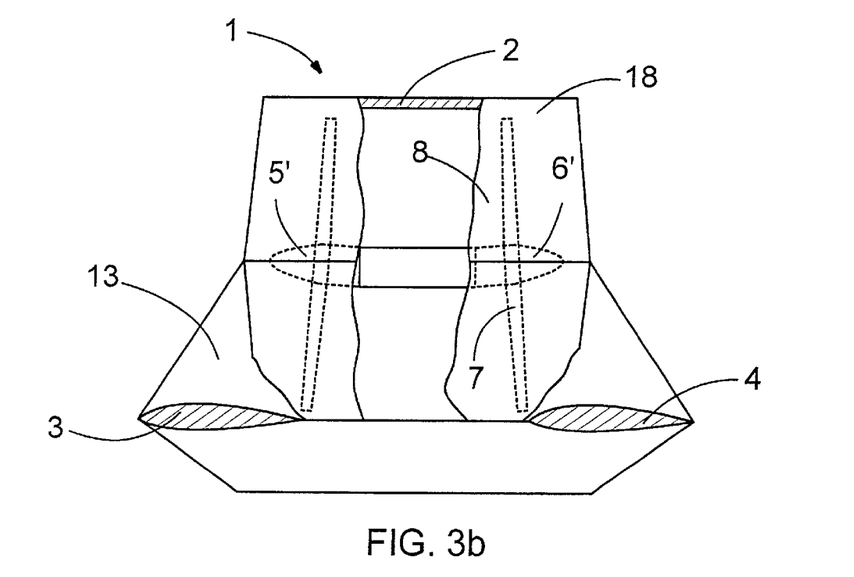

FIG. 3*a* is a schematic front view of a second aircraft 1 according to the invention, and FIG. 3*b* is a partially sectional side view of the same. The aircraft 1 according to FIGS. 3*a* and 3*b* comprises two blow propeller pairs, the first blow propeller pair comprising the blow propellers 5 and 6 and the second blow propeller pair comprising blow propellers 5' and 6'. In FIG. 3*b*, the blow propellers 5, 5', 6 and 6' are indicated in broken lines and arranged in a slightly oblique position. The blow propellers 5, 5', 6 and 6' are supported against the upper wing 2 and against wing supports 18 which support the upper wing 2 against the front wing 3 and the rear wing 4 by the propeller supports 9. The utility space 13, which is supported at its lower part against supporting parts 26 that extend downwards from the blow propellers 5, 5', 6, 6', is provided between the blow propeller pairs 5, 6 and 5', 6'. At its upper part, the utility space 13 is supported against the upper wing 2 by supporting parts 17. Alternatively, the utility space 13 can be supported at its lower part also against the front wing 3 and the rear wing 4. The upper wing 2, the front wing 3, the rear wing 4, the utility space 13, the supporting parts 17 and the wing supports 18 combine to form the tunnel duct 11 with its lower part opening through the air discharge opening. The aircraft 1 equipped with two blow propeller pairs as in FIGS. 3 and 3*b* is easier to steer than an aircraft equipped with one blow propeller pair only.

Figure 4A:
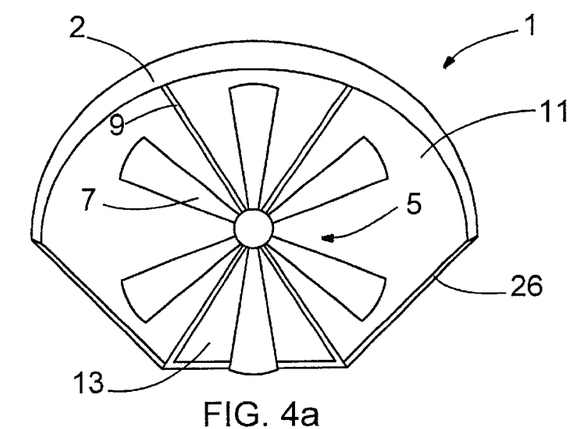
FIG. 4a is a schematic front view of a third embodiment of the aircraft of the invention.
Figure 4B:
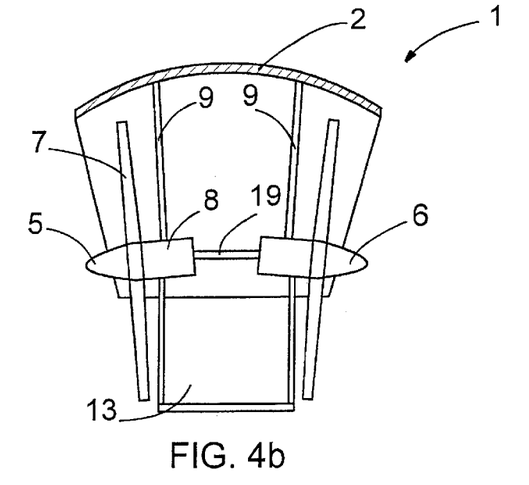
FIG. 4b is a partially sectional side view of the same.

FIG. 4*a* is a schematic front view of a third aircraft 1 according to the invention, and FIG. 4*b* is a partially sectional side view of the same. In the aircraft 1 according to FIGS. 4*a* and 4*b*, the upper wing 2 is concave, and no front wing nor rear wing is provided at all, whereby the upper wing 2 forms the supporting structure and the tunnel duct 11 of the aircraft 1. The blow propellers 5 and 6 are arranged in a slightly oblique position and supported against the upper wing 2 by the propeller supports 9, and the utility space 13 is arranged between the blow propellers 5 and 6 below the centre thereof as seen from the side of the aircraft 1. For structural strength, the blow propellers 5 and 6 are supported against each other by an intermediate support 19. The blow propellers 5 and 6 can be implemented such that the blade angles of the blades 7 can be adjusted wide enough for them to at least partly operate as centrifugal blowers, increasing the lifting force the aircraft 1 is subjected to.

Figure 5:
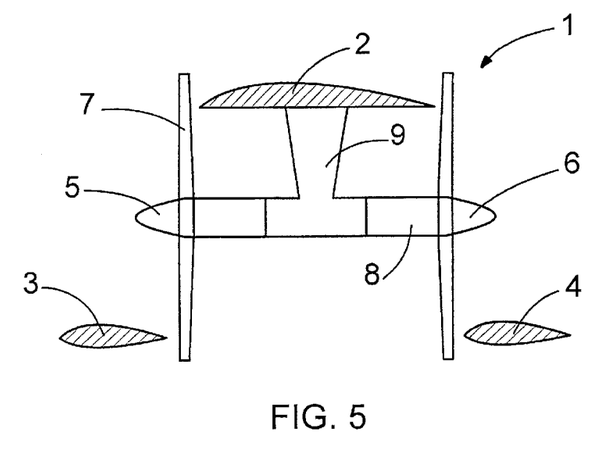
FIG. 5 is a partially sectional schematic side view of a fourth embodiment of the aircraft of the invention.

FIG. 5 is a schematic, partially sectional side view of a fourth aircraft 1 according to the invention. In the aircraft 1 according to FIG. 5, the blades 7 of the blow propellers 5 and 6 partly extend above the upper wing 2 and below the front wing 3 and the rear wing 4, which form the supporting structure of the aircraft 1, whereby stalling of the upper wing 2 and the front wing 3 and the rear wing 4 decreases.

Figure 6A:
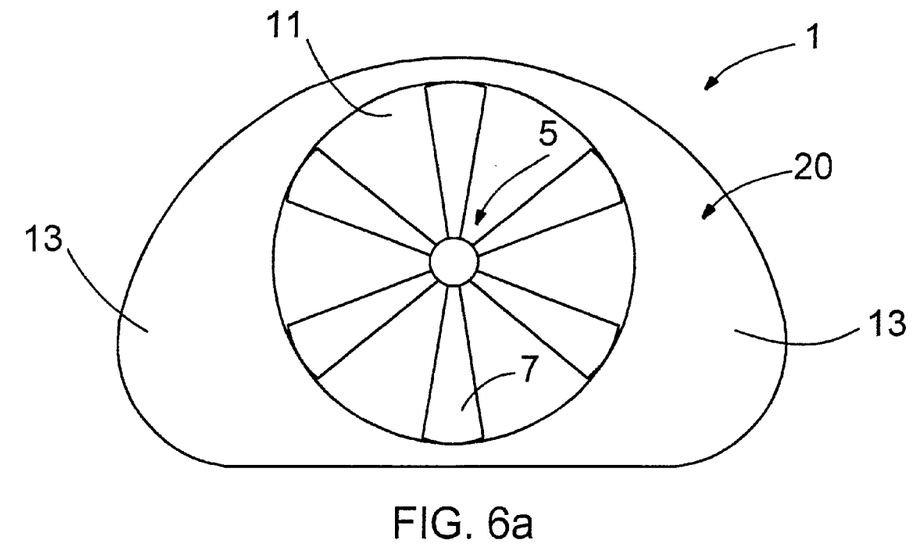
FIG. 6a is a schematic front view of a fifth embodiment of the aircraft of the invention.
Figure 6B:
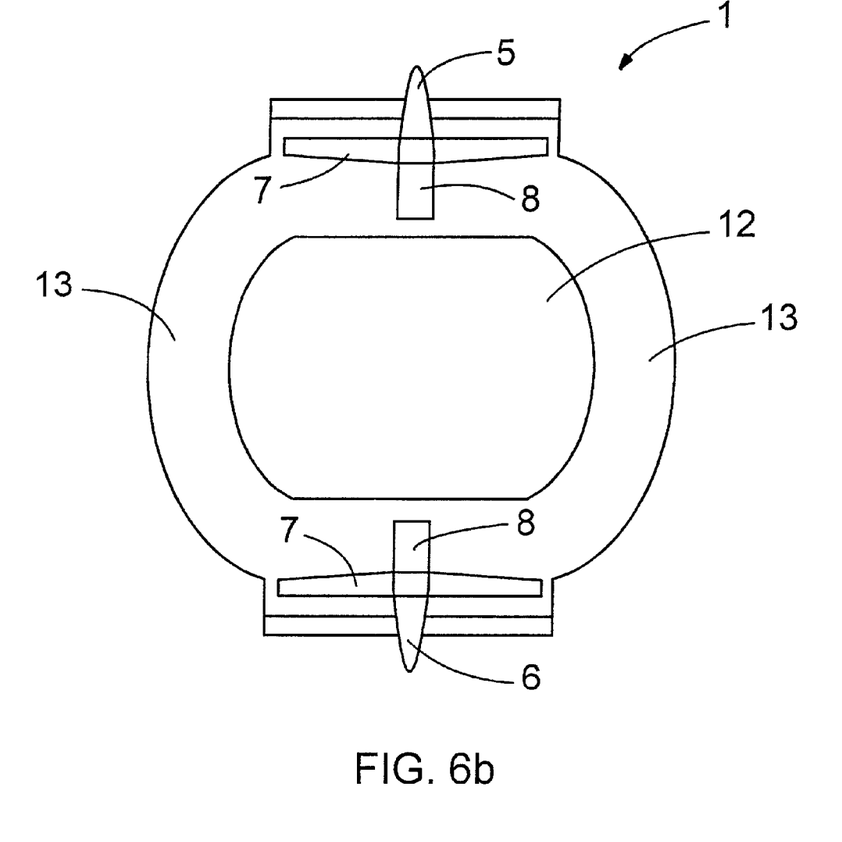
FIG. 6b is a bottom view of the same.

FIG. 6*a* is a schematic front view of a fifth aircraft 1 according to the invention, and FIG. 6*b* is a bottom view of the same. In the aircraft 1 according to FIGS. 6*a* and 6*b*, a casing 20 comprises the supporting structure of the aircraft 1, and the blow propeller 5 located at the front edge and the blow propeller 6 located at the rear edge of the aircraft 1 and the casing 20 combine to form the tunnel duct 11, the air discharge opening 12 being provided at the lower part thereof, from which air discharge opening 12 the air drawn into the tunnel duct 11 is discharged during the take-off of the aircraft 1, producing a force to lift the aircraft 1. The aircraft 1 can also be advantageously used as a hovercraft.

Figure 7A:
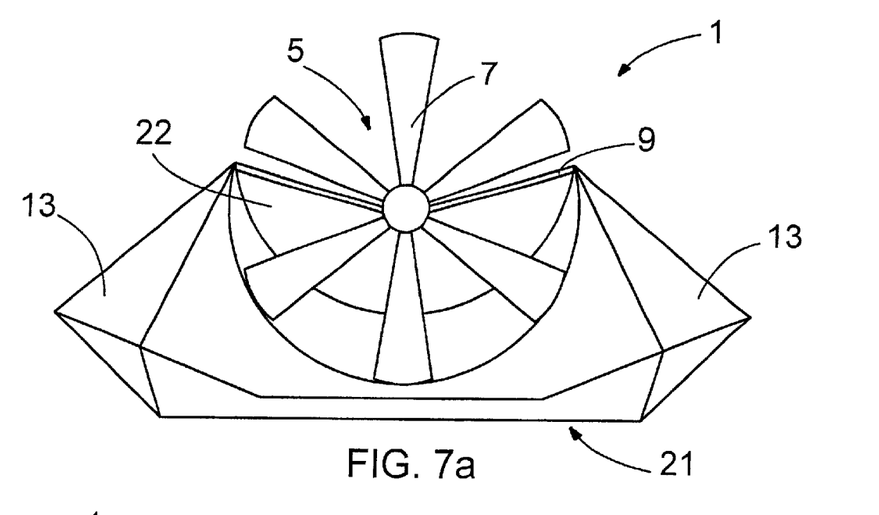
FIG. 7a is a schematic front view of a sixth embodiment of the aircraft of the invention.
Figure 7B:
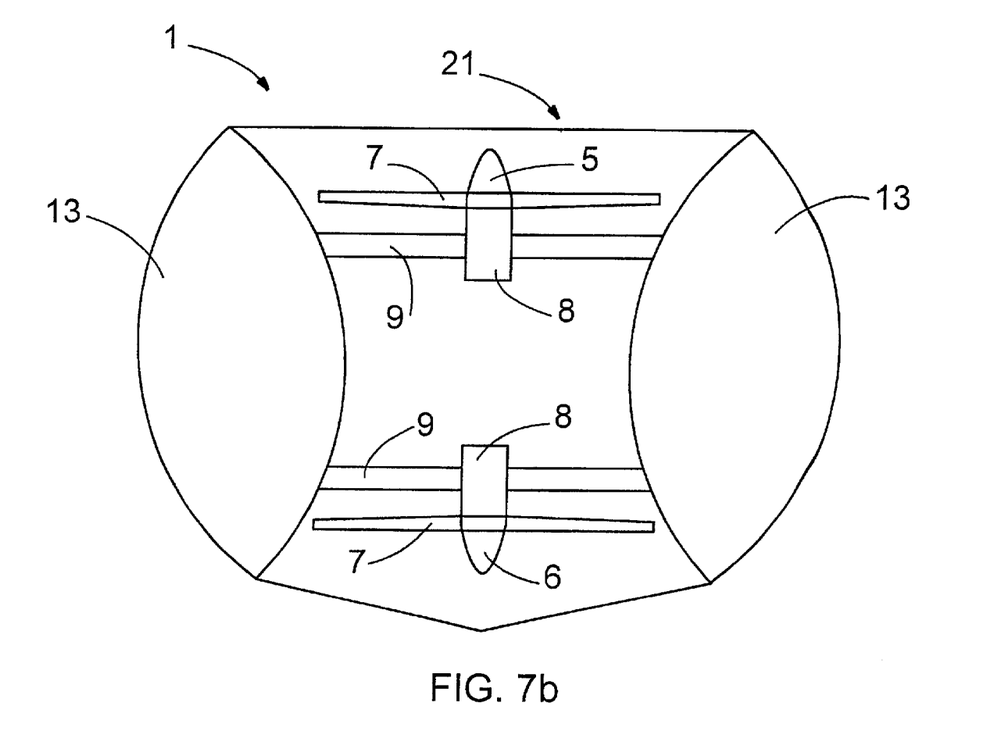
FIG. 7b is a top view of the same.

FIG. 7*a* is a schematic front view of a sixth aircraft 1 according to the invention, and FIG. 7*b* is a top view of the same. In the aircraft 1 according to the FIGS. 7*a* and 7*b*, the blow propeller 5 is located above the front edge of a wing 21 operating as the supporting structure of the aircraft 1, and the blow propeller 6 is located above the rear edge of the wing 21. The blow propellers 5 and 6 are supported against the wing 21 by the propeller supports 9. The wing 21 is shaped such that substantially a half of an open-topped tunnel duct 22 is provided in the middle of the wing, the utility spaces 13 being located at the both sides of the tunnel duct 22. When the blade angles of the blades 7 of the blow propellers 5 and 6 are adjusted as a function of a rotation angle, the blow propellers 5 and 6 can be directed to draw a low pressure on the upper surface of the aircraft 1 into the half of the tunnel duct 22 in order to lift the aircraft 1. In this case, the direction of force vectors F1 to F4 is the opposite to that shown in FIG. 2*b*. After take-off, the blade angles of the blades 7 of the blow propeller 5 are reversed such that the blow propellers 5 and 6 produce a propulsive force to enable the aircraft 1 to fly horizontally.

Figure 8A:
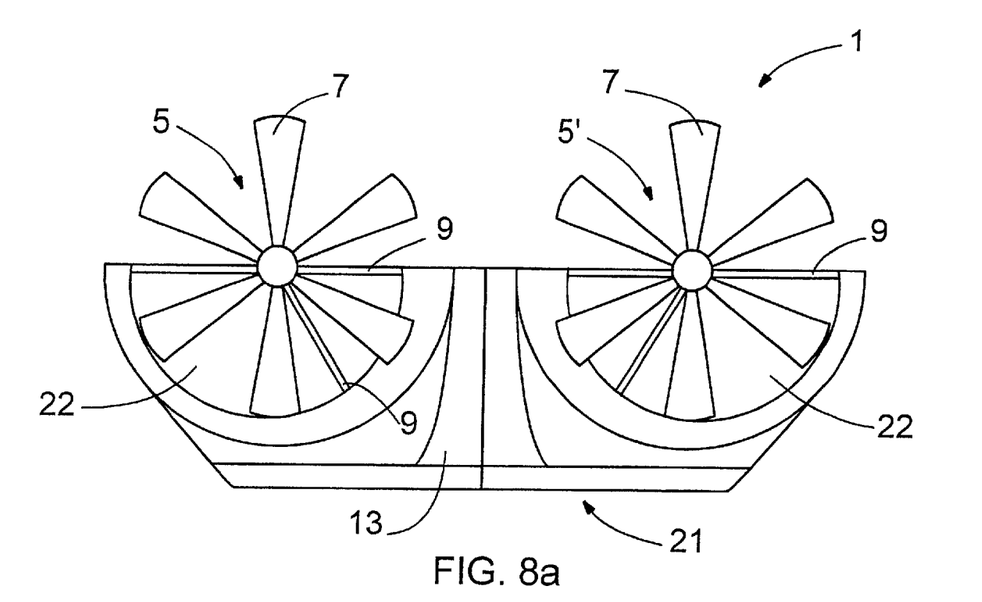
FIG. 8a is a schematic front view of a seventh embodiment of the aircraft of the invention.
Figure 8B:
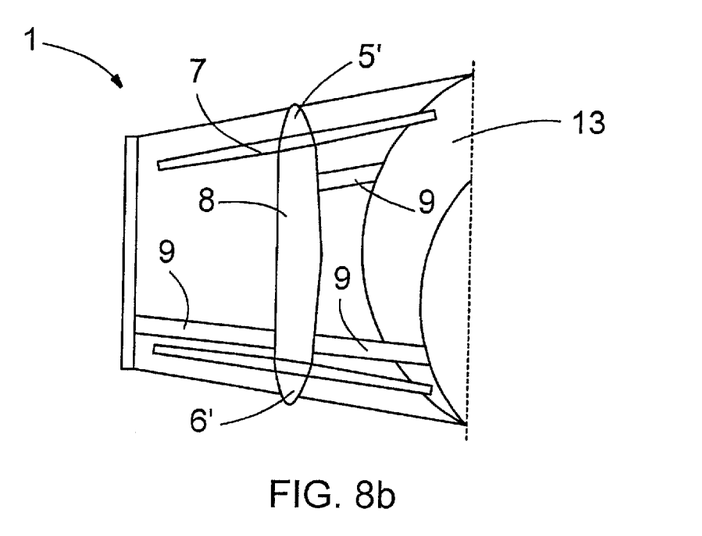
FIG. 8b is a partially sectional top view of the same.

FIG. 8*a* is a schematic front view of a seventh aircraft 1 according to the invention, and FIG. 8*b* is a partially sectional top view of the same, viewed in the longitudinal direction of the aircraft 1, the section being indicated in a broken line in FIG. 8*b*. The aircraft 1 according to FIGS. 8*a* and 8*b* operates on the same principle as the aircraft shown in FIGS. 7*a* and 7*b*. The wing 21 operating as the supporting structure of the aircraft 1 according to FIGS. 8*a* and 8*b* comprises two halves of the tunnel ducts 22, the utility space 13 provided therebetween. The blow propellers 5 and 5' are provided above the front edges of the halves of the tunnel ducts 22, and the blow propellers 6 and 6' are provided above the rear edge, the blow propellers 5' and 6' as well as the blow propellers 5 and 6 being arranged slightly obliquely with respect to the diameter in the lateral direction of the aircraft 1. In order to lift the aircraft 1, the blow propellers 5, 5', 6 and 6' draw a low pressure on the upper surface of the wing 21 into the halves of the tunnel duct 22.

Figure 9A:
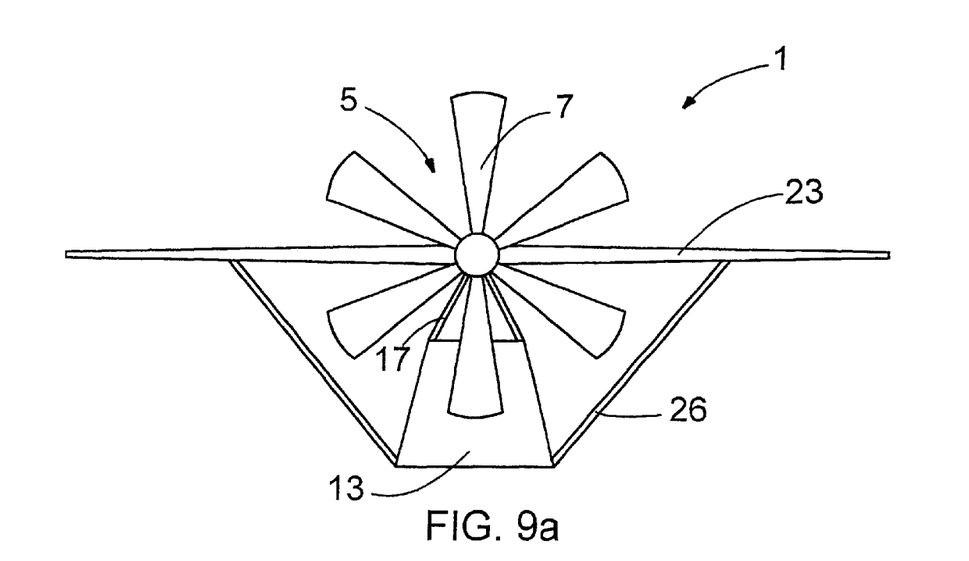
FIG. 9a is a schematic front view of an eighth embodiment of the aircraft of the invention, and FIG. 9b a top view of the same.
Figure 9B:
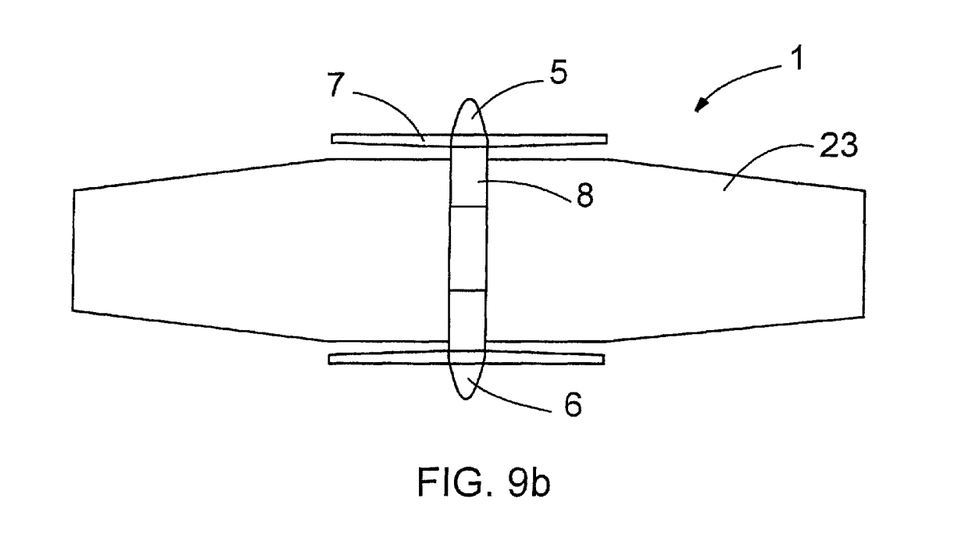

FIG. 9*a* is a schematic front view of an eighth aircraft 1 according to the invention, and FIG. 9*b* is a top view of the same. In the aircraft 1 according to FIGS. 9*a* and 9*b*, the blow propeller 5 is located at the front edge of a wing 23 operating as the supporting structure of the aircraft 1, and the blow propeller 6 is located at the rear edge of the wing 23 such that their axles are substantially at the level of the wing 23. The utility space 13 is located below the wing 23 and supported at its upper end against the wing 23 by the supporting parts 17 and at its lower end by the supporting parts 26. In order to lift the aircraft 1 in the air, the blade angles of the blades 7 of the blow propellers 5 and 6 are adjusted as a function of a rotation angle according to the above-described principle such that the blow propellers 5 and 6 both blow air under the wing 23, thus producing an overpressure on the lower surface of the wing 23, and draw air from above the wing 23, thus producing a low pressure on the upper surface of the wing 23 in order to provide a force to lift the aircraft 1. In comparison with FIG. 2b, this means that force vectors F1 and F3 are inverted. When a transition to horizontal flight takes place, the blade angles of the blades 7 of the blow propellers 5 and 6 are reversed in the manner disclosed above such that the blow propellers 5 and 6 produce a propulsive force to move the aircraft 1.

Figure 10A:
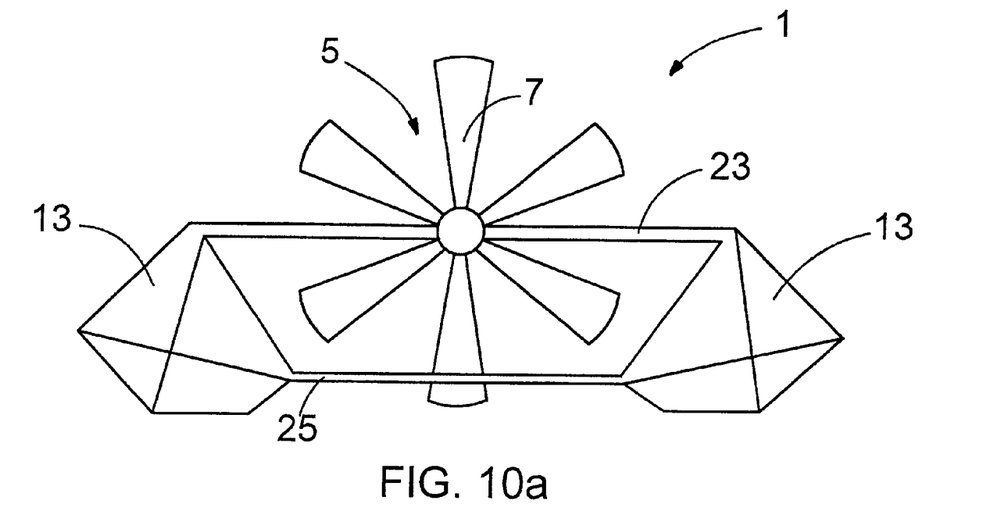
FIG. 10a is a schematic front view of a ninth embodiment of the aircraft of the invention.
Figure 10B:
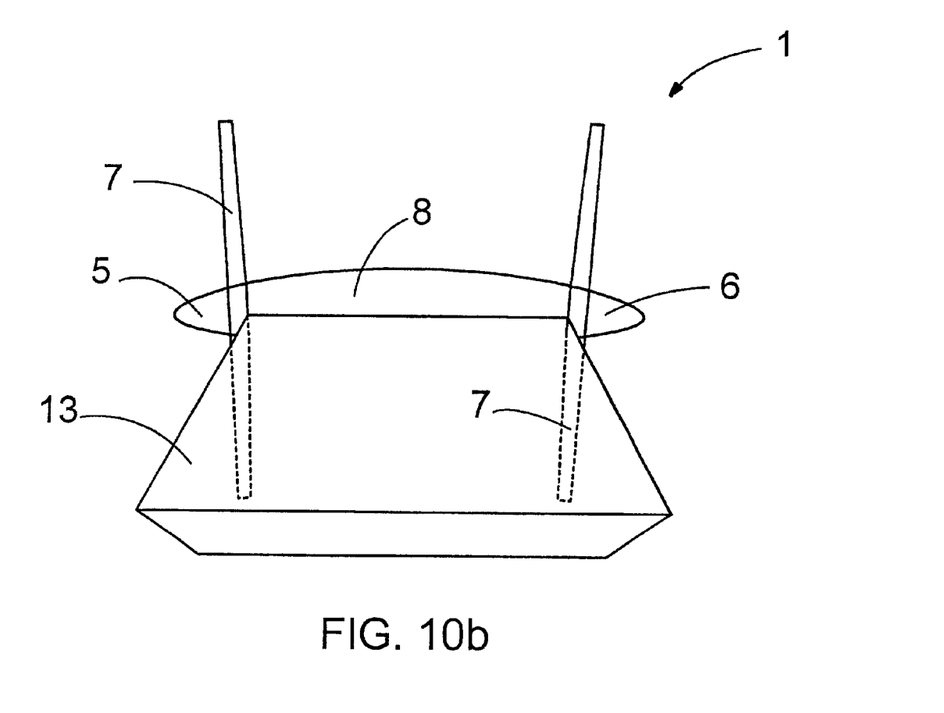
FIG. 10b is a side view of the same.

FIG. 10a is a schematic front view of a ninth aircraft 1 according to the invention, and FIG. 10b is a side view of the same. The aircraft 1 according to FIGS. 10a and 10b is similar in structure and operation to the aircraft described in FIGS. 9a and 9b. The blow propeller 5 of the aircraft 1 is located at the front edge of the wing 23 and the blow propeller 6 is located at the rear edge of the wing 23 such that their axles are substantially at the level of the wing 23. At both sides of the blow propellers 5 and 6, the utility spaces 13 are provided, supported at their upper side against the wing 23 and at their lower side both at their front end and rear end against each other by stabilizers 25. By placing the utility spaces 13 at both sides of the blow propellers 5 and 6 located in the middle, the structure of the aircraft 1 becomes good and strong as far as the strength of materials is concerned. The aircraft 1 according to FIGS. 10a and 10b is steered as shown in connection with FIGS. 9a and 9b. Thanks to the high overpressure generated between the utility spaces 13, the aircraft 1 can also be used as a hovercraft.

Figure 11A:
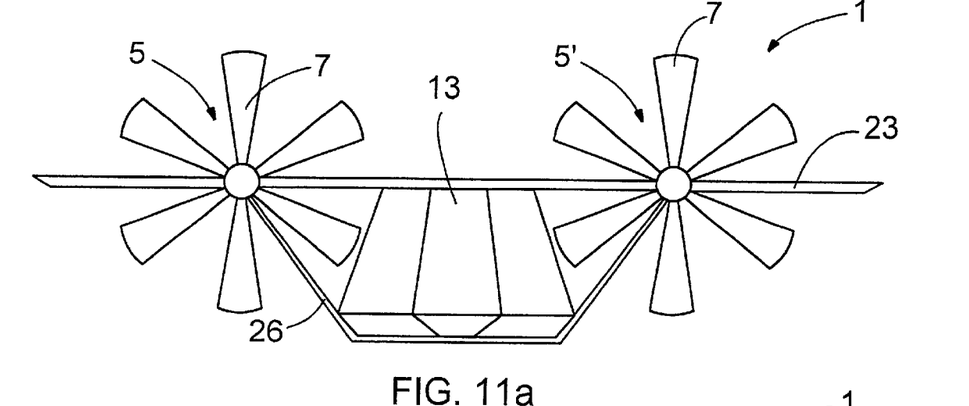
FIG. 11a is a schematic front view of a tenth embodiment of the aircraft of the invention.
Figure 11B:
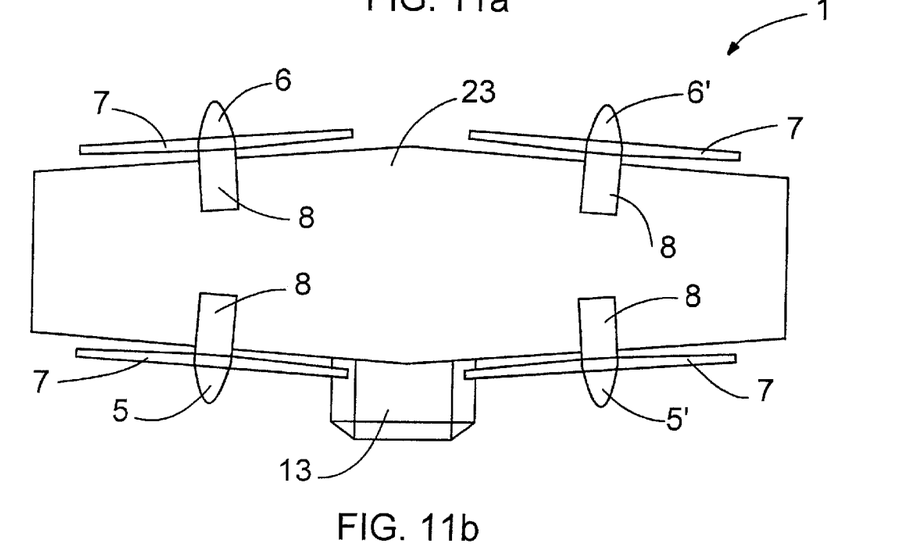
FIG. 11b is a side view of the same.

FIGS. 11 a and 11 b schematically show a tenth aircraft 1 according to the invention, FIG. 11a being a front view and FIG. 11b being a top view. As to operating principles, the aircraft 1 according to the FIGS. 11a and 11b is similar to the aircraft according to FIGS. 9a, 9b, 10a and 10b. The aircraft 1 according to FIGS. 11a and 11b comprises two blow propeller pairs 5, 6 and 5', 6'. The blow propellers 5 and 5' are located at the front edge of the wing 23 and the blow propellers 6 and 6' are located at the rear edge of the wing 23 such that the axles of the blow propellers 5 and 6 and 5' and 6' are paired to be substantially opposite each other at the level of the wing 23. The utility space 13, which is at its upper part directly and at its lower part through the supporting parts 26 supported against the wing 23, is provided between the blow propeller pairs 5, 6 and 5', 6' below the wing 23. The aircraft 1 according to FIGS. 11a and 11b is steered in the manner disclosed in connection with FIGS. 9a and 9b.

Direct-current motors, for example, can be used as the driving mechanism 8 of the aircraft 1. Each propeller may have a driving mechanism of its own or the propellers may be operated from a common driving mechanism. The driving mechanism may also comprise a gear or a gear system. The electric power necessary for the motors is provided by batteries located on the aircraft 1. Thanks to the high efficiency of the propellers, the energy needed by the aircraft 1 can also be provided by covering the surface of the aircraft 1 with solar cells. Also fuel cells can be used as a source of energy. The propellers can be used as wind generators, whereby the direct-current motors rotating the propellers operate as generators to charge the batteries located on the aircraft 1. The batteries are preferably located at the points of the blades 7 of the propellers, whereby the propellers can be readily sped to a high speed in order to store the rotation energy for take-off, for example. Instead of batteries, weights can be located at the points of the blades 7 of the propellers for storing the rotation energy in the propeller. The aircraft of the invention can be small and ultralight or large and heavy. Propeller turbines can also be used as the power units. Since energy can be stored by rotation both in the propellers and in the motors, motor ratings may be substantially lower than on helicopters. The effect of the smaller motor is further increased in the reduced weight of the aircraft 1. A low motor rating is sufficient for horizontal flight since the blow propellers that rotate in the opposite directions have a high efficiency and the lifting force of the aircraft 1 is provided from its supporting structure, which can be comprised of the wings or the convex or concave shape of the apparatus. Since all steering manoeuvres of the aircraft 1 can be carried out by adjusting the blade angles of the blades 7 of the propellers as a function of a rotation angle, the aircraft 1 is structurally simple but extremely versatile in use.

The drawings and the related description are only intended to illustrate the idea of the invention. In its details the invention may vary in the scope of the claims. Hence, the aircraft 1 may vary as far as its appearance, the number of the blow propeller pairs or propeller pairs as well as the number of the utility spaces are concerned. If the supporting structure of the aircraft 1 is comprised of the upper wing 2, the front wing 3 and the rear wing 4, it is possible to use the lifting power on the upper wing 2 only, whereby the front wing 3 and the rear wing 4 can be totally omitted or they can be extremely narrow, almost resembling a supporting part. The aircraft 1 can also be used for living and it can also move on the water.

What is claimed is:

1. A method of steering an aircraft, comprising the steps of:

rotating at least two propellers about respective collinear axles that are parallel to a longitudinal axis of the aircraft, blade angles of at least one propeller of the aircraft being adjustable such that the blow power of the at least two propellers provides the aircraft with a lifting force;

adjusting the blade angles of at least one propeller after take-off of the aircraft such that the blow power of the at least two propellers provides the aircraft with horizontal flight;

adjusting the blade angles of the at least one propeller as a function of a rotation angle of the at least one propeller; and maintaining the axles parallel to the longitudinal axis of the aircraft during an entire flight of the aircraft.

2. The method as claimed in claim 1, wherein a rotation circle of the at least two propellers is divided into sectors, the blade angles of blades of the at least one propeller being adjusted in each sector.

3. The method as claimed in claim 1, wherein the blade angles of each propeller are adjusted as a function of a rotation angle of the at least one propeller.

4. The method as claimed in claim 1, wherein the supporting structure of the aircraft is comprised of an upper wing, the at least two propellers being arranged below the upper wing such that during take-off the at least two propellers draw ambient air under the upper wing into the space between the at least two propellers and the upper wing directs the air drawn under the upper wing downwards, producing an overpressure on a lower surface of the upper wing in order to provide a force to lift the aircraft.

5. The method as claimed in claim 1, wherein the supporting structure of the aircraft is comprised of an upper wing, a front wing located below the upper wing, and a rear wing located below the upper wing behind the front wing, an air discharge opening being provided between the front wing and the rear wing and the at least two propellers being arranged at least mainly below the upper wing and substantially above the front wing and the rear wing such that during take-off the blade angles of the at least two propellers are adjusted such that the at least two propellers draw ambient air under the upper wing into the space between the at least two propellers and the air is discharged under the aircraft through the air discharge opening, producing an overpressure on a lower surface of the upper wing and a low pressure on an upper surfaces of the front wing and the rear wing, thus providing a force to lift the aircraft.

6. The method as claimed in claim 1, wherein the supporting structure of the aircraft is comprised of a wing which forms at least one open-topped tunnel duct, at least two propellers being located above the wing substantially at points of the tunnel duct such that during take-off the blade angles of the at least two propellers are adjusted such that the at least two propellers draw a low pressure into the tunnel duct and product a force to lift the aircraft.

7. A method as claimed in claim 1, wherein the supporting structure of the aircraft is comprised of a wing, at least two propellers being arranged with respect to a rear edge and a front edge of the wing such that the axles of the at least two propellers are substantially at a level of the wing such that during take-off of the aircraft the blade angles of the at least two propellers are adjusted such that the at least two propellers draw air from above the wing and produce a low pressure on an upper surface of the wing, and blow air under the wing and produce an overpressure on a lower surface of the wing, thus providing a force to lift the aircraft.

8. A method as claimed in claim 1, the method further comprising adjusting at least one of a rotation speed and a rotation direction of the at least two propellers.

9. An aircraft comprising:
 a supporting structure;
 at least one utility space connected to said supporting structure;
 at least two propellers connected to said supporting structure and having axles that are collinear and that are arranged substantially parallel to a longitudinal axis of the aircraft, said at least two propellers having a fixed axis of rotation with respect to a body of the aircraft; and
 a driving mechanism to rotate each propeller, the blade angles of at least one propeller of the aircraft being adjustable such that a blow power of the at least two propellers provides the aircraft with a lifting force such that after take-off of the aircraft the blow power of the at least two propellers provides the aircraft with horizontal flight, as a function of a rotation angle of the at least one propeller.

10. The aircraft as claimed in claim 9, wherein a rotation circle of the at least two propellers is divided into sectors, the blade angles of blades of the at least two propellers being adjustable in each sector.

11. The aircraft as claimed in claim 9, wherein the blade angles of each propeller are adjustable as a function of a rotation angle of the at least one propeller.

12. The aircraft as claimed in claim 9, wherein at least one of a rotation direction and a rotation speed of the at least two propellers are adjustable.

13. The aircraft as claimed in claim 9, wherein the supporting structure of the aircraft is comprised of an upper wing below which the at least two propellers are arranged.

14. The aircraft as claimed in claim 9, wherein the supporting structure of the aircraft is comprised of an upper wing, a front wing located below the upper wing, and a rear wing located below the upper wing behind the front wing, the at least two propellers being arranged at least mainly below the upper wing and above the front wing and the rear wing.

15. The aircraft as claimed in claim 13, wherein a rotation circle of the at least two propellers extends above the upper wing.

16. The aircraft as claimed in claim 15, wherein the rotation circle of the at least two propellers extends both above the upper wing and below the front wing and the rear wing.

17. The aircraft as claimed in claim 9, wherein the supporting structure of the aircraft is comprised of a wing which forms at least one open-topped tunnel duct, the at least two propellers being located above the wing substantially at points of the tunnel duct.

18. The aircraft as claimed in claim 9, wherein the supporting structure of the aircraft is comprised of a wing, the at least two propellers being arranged such that the axles of the at least two propellers are substantially at a level of the wing.

19. The aircraft as claimed in claim 9, wherein the supporting structure of the aircraft is comprised of a casing of the aircraft.

20. The aircraft as claimed in claim 9, wherein the at least two propellers are blow propellers.

21. The aircraft as claimed in claim 9, wherein the at least two propellers are propeller turbines.

22. The aircraft as claimed in claim 9, wherein the driving mechanism of the at least one propeller is an electric motor.

23. The aircraft as claimed in claim 22, the aircraft further comprising one of one or more batteries, solar cells and fuel cells to operate as a power source of the electric motor.

24. The aircraft as claimed in claim 23, wherein the at least two propellers are arranged to charge the batteries with wind energy.

25. The aircraft as claimed in claim 9, wherein the aircraft is arranged to be used as a hovercraft.

26. An aircraft comprising:
 a supporting structure:
 at least two propellers connected to said supporting structure, said at least two propellers being rotatable about collinear axles that are substantially parallel to a longitudinal axis of the aircraft; and
 a driving mechanism to rotate each propeller, a blade angle of at least one propeller being continually adjustable during rotation of said at least one propeller, as a function of a rotation angle of the at least one propeller, to impart a lifting force, to enable horizontal flight after takeoff of the aircraft, and to steer the aircraft.

* * * * *